June 12, 1928.
J. H. WILSON
1,673,612
TRACTOR EXTENSION FRAME
Filed Oct. 6, 1925
3 Sheets-Sheet 1
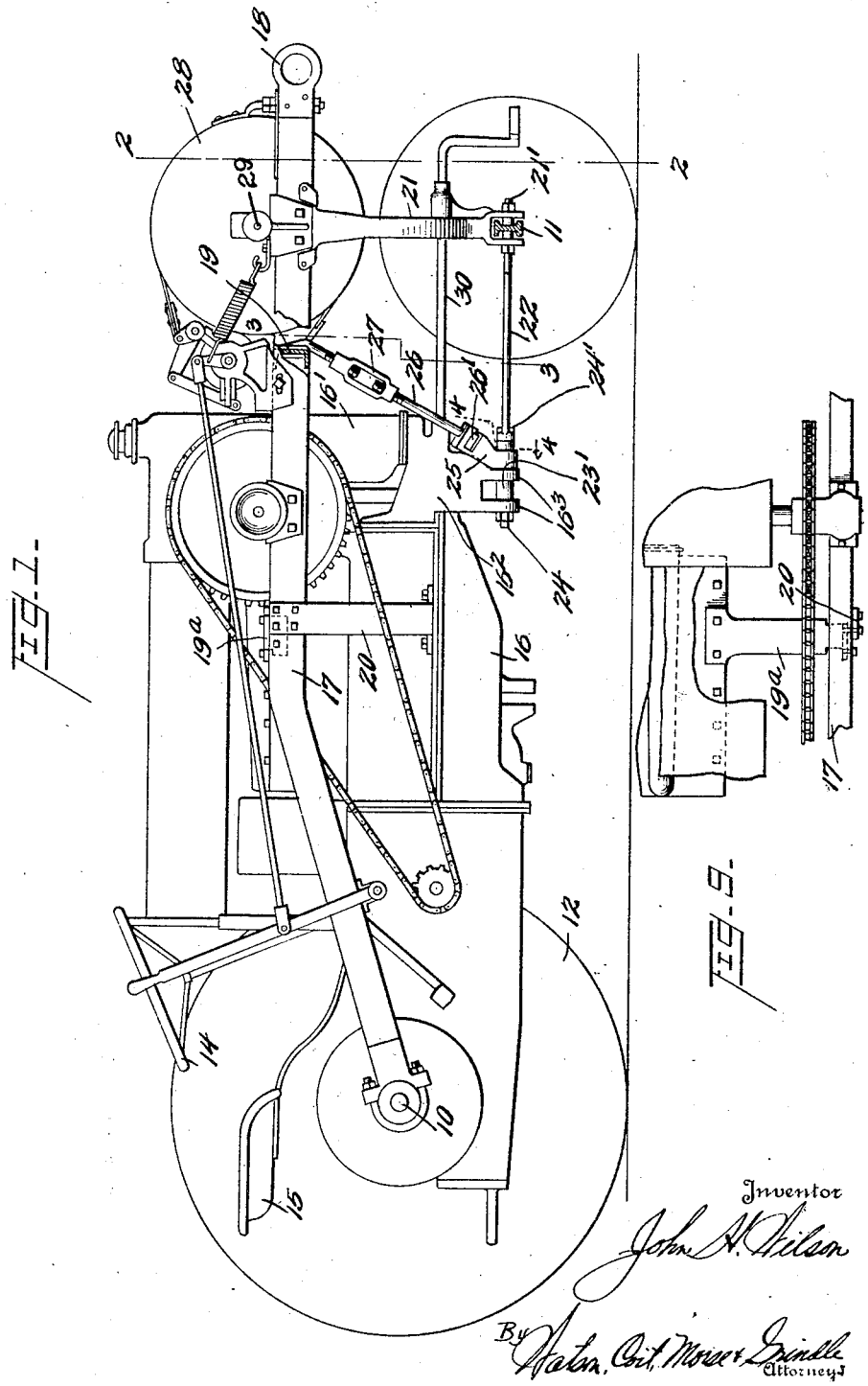

June 12, 1928.   J. H. WILSON   1,673,612
TRACTOR EXTENSION FRAME
Filed Oct. 6, 1925   3 Sheets-Sheet 2
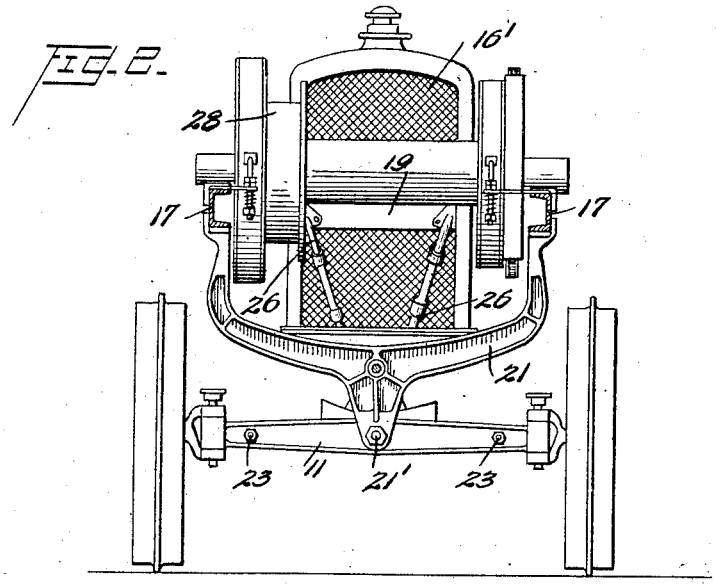
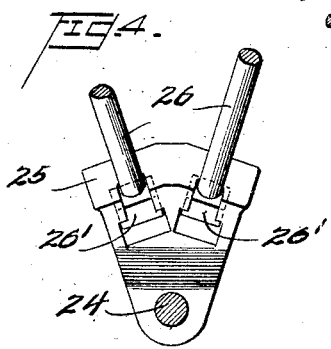
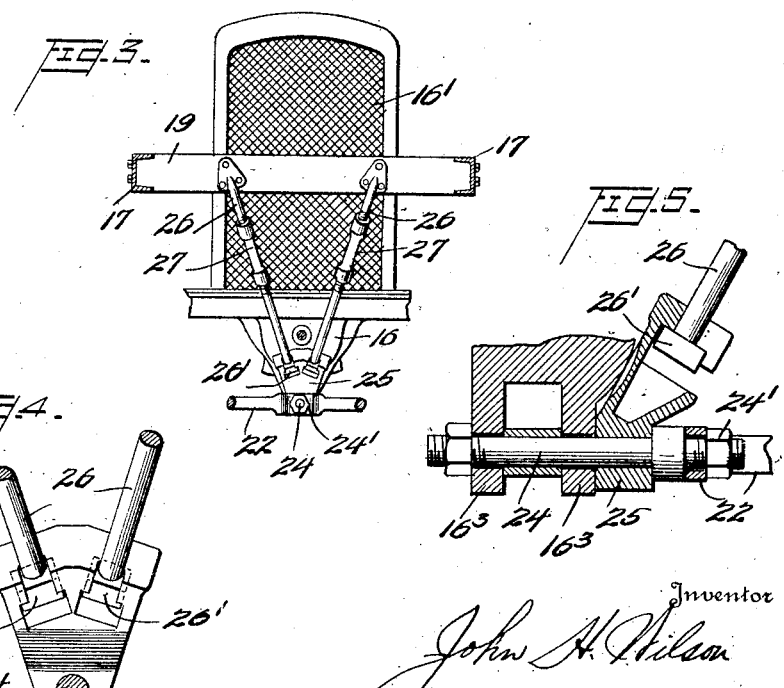

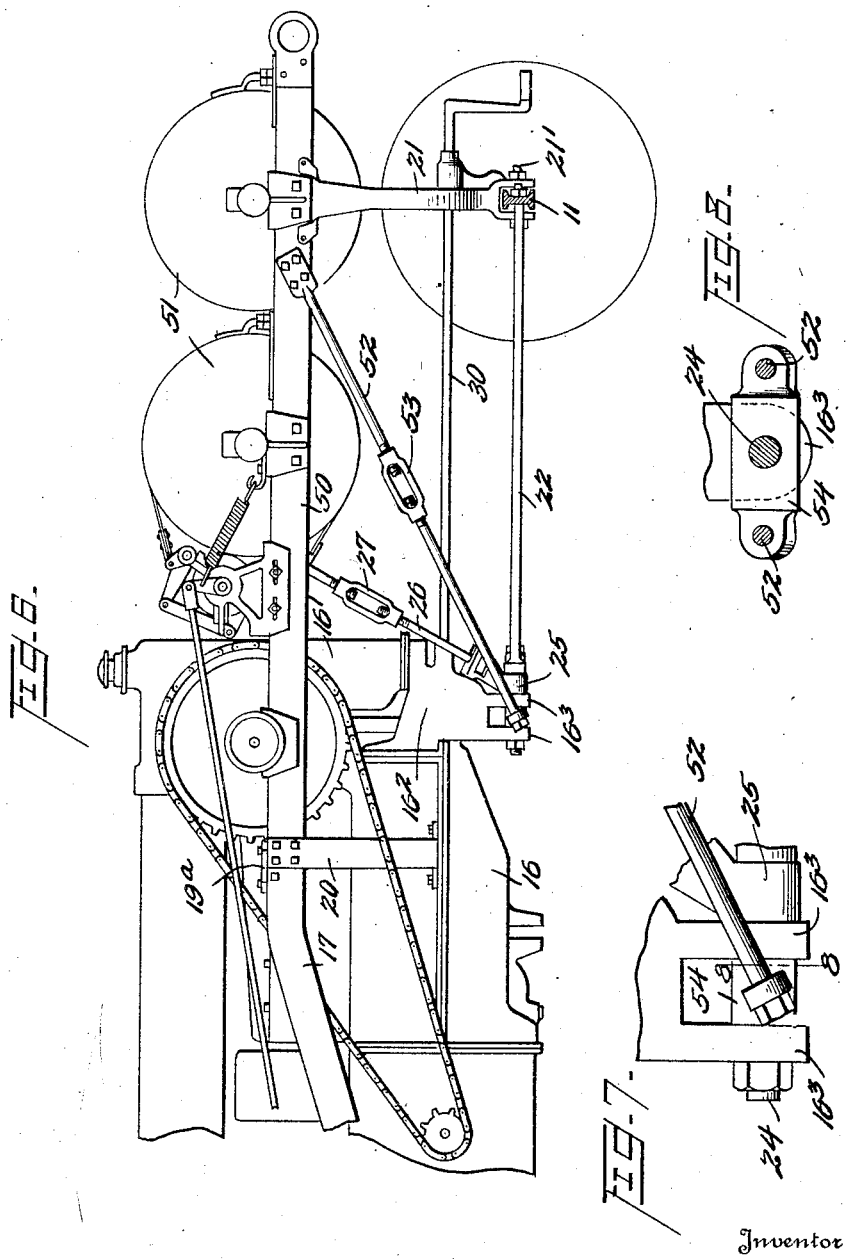

Patented June 12, 1928.

1,673,612

UNITED STATES PATENT OFFICE.

JOHN HART WILSON, OF BURKBURNETT, TEXAS.

TRACTOR EXTENSION FRAME.

Application filed October 6, 1925. Serial No. 60,888.

This invention relates to tractors and particularly to tractors of the winch carrying type such as illustrated in my Patent No. 1,499,045 granted June 24, 1924.

The general object of the invention is to provide a novel supporting frame for the front end of the tractor engine casing and the winch, in that type of tractor in which a winch is carried at the forward end.

The advantages and specific objects of the invention will become apparent to one skilled in the art as its novel features are brought out in the following detailed description and in the accompanying drawings. In the drawings a preferred embodiment is shown, but it will be understood that this particular form of the invention is set forth by way of example only, and that changes in the design and arrangement of the component elements may be made without departing from its spirit and scope.

In the drawings:

Fig. 1 is a side elevation of a tractor embodying my novel and improved front end frame construction;

Fig. 2 is a section on line 2—2 of Figure 1;

Fig. 3 is a section on line 3—3 of Figure 1;

Fig. 4 is a section on line 4—4 of Figure 1, on a larger scale;

Fig. 5 is a section through a detail;

Fig. 6 is a side elevation of a tractor showing a modified form of the invention;

Fig. 7 is a side elevation of a detail of the modified form of tractor;

Fig. 8 is a section on line 7—7 of Figure 7; and

Fig. 9 is a partial plan view of the tractor, partly broken away, showing portion of the supporting frame construction.

The details of the winch operating mechanism of the tractor are fully illustrated and described in my prior patent and it is unnecessary to set them forth herein since they form no part of the present invention.

The rear axle of the tractor is indicated at 10 and the front axle at 11, each axle having wheels rotatably mounted thereon in the usual manner. The rear wheels 12 are the driving wheels, the front wheels being supporting and steering wheels adapted to be turned laterally about spindles at the ends of axle 11 by steering mechanism of conventional type operated by means of a hand wheel 14, which is within reach of a driver seated upon the operator's seat 15.

The engine casing is indicated at 16 and it will be understood that hereinafter the term engine casing indicates generally an engine supporting and enclosing casing of any kind, including the cylinder block and either with radiator attached or otherwise. In the present instance the radiator is indicated at 16' and it will be seen that this is rigidly supported upon a portion $16^2$ of the engine casing, the bottom of which portion of the casing is provided with downwardly extending parallel and spaced transversely extending flanges $16^3$.

Side frame members are indicated at 17, these side frame members being exactly alike, having their rear ends secured to axle 10, their front ends provided with rings 18, and having intermediate their front and rear ends the cross brace 19, the horizontal braces $19^a$ which rigidly connect the respective frame members 17 to the top of the cylinder block, and the inclined braces 20, one of which connects the mid-portion of each side frame to the engine casing.

A U-shaped yoke 21 is pivoted at its center to the axle 11, midway of the length of the axle, by means of bolt 21', the upper ends of this yoke being rigidly secured to the side frame members by a number of bolts. By virtue of the pivotal connection between the yoke and the front axle, the axle is enabled to tilt in a vertical plane about the pivot bolt 21' through a considerable angular distance, permitting the wheels to adjust themselves to the irregularities of any broken ground over which the tractor is passing. To prevent movement of axle 11 axially of the tractor, the radius rod 22 is provided, this device comprising the usual V-shaped member having its forward ends secured at 23, 23 to the axle 11 and its rear end secured to the engine casing by a bolt 24 and nut 24', bolt 24 extending axially of the tractor and passing through aligned apertures in the lug $16^3$, $16^3$ and through the radius rod. The radius rod may, of course, rock about the bolt 24, to a limited extent, as the axle 11 rocks in a vertical plane.

Upon this bolt, in advance of the forward lug $16^3$ but in rear of the radius rod, is a block 25, the block being provided with an aperture for the reception of the bolt. This block extends upwardly and forwardly and is provided with two recesses for the reception of the lower ends of brace members 26, 26 respectively which extend upwardly and forwardly from block 25, the upper ends of these arms being rigidly secured to the cross brace 19. The lower ends of these rods are provided with heads 26', 26' and the slots in block 25 are inverted T slots so that the rods may not pull out after their insertion. The rods are adjustable in length by virtue of the turn buckle devices 27.

The winch drum is indicated at 28 and its supporting axle at 29. It will be seen that the weight of the drum passes downwardly vertically through the yoke 21 to the axle 11. It will be further observed that by virtue of the inclined brace rods 26 the weight of the forward end of the engine casing is transmitted to the cross member 19 at a point not far distant from the yoke 21, through which this weight, or that portion of it which is not carried by the rear axle, is transmitted downwardly to the axle 11 and wheels. The brace rods 26 not only support the weight of the front end of the engine casing, but also constitute means for stiffening the entire structure, preventing twisting of the frame, that is, preventing movement of the side frame members relatively to each other and to the engine casing, as the machine passes over rough ground. The yoke 21 is apertured for the reception of the crank 30 by means of which the engine may be started.

The frame illustrated, including members 17, 19ᵃ, 20 and 26 has proven particularly advantageous in practice. The braces 20 may be said to be "hold down" braces since they prevent relative vertical movement of the engine casing and side frame members, that is, they prevent the front end of the engine casing from moving upwardly between, and relatively to, the side frame members 17. The short horizontal braces 19ᵃ prevent, with some assistance from braces 20, horizontal movement of the engine casing relatively to the side frame members 17. And the brace rods 26 transfer the weight of the engine casing, as previously pointed out, to the frame members 17, through cross brace 19, and also further stiffen the frame construction. The frame above described is of relatively light construction, yet of great strength, and will not warp or twist even when subjected to heavy stresses.

In Figure 6 a modified form of frame is shown in which the side frame members 50 are longer in order that two winches 51 may be supported thereon, instead of a single winch. In this event additional brace rods 52 are used, these rods extending forwardly from the bottom of the engine casing and having their upper ends rigidly bolted to the side frame members respectively. Turn buckles 53 are provided for adjusting the lengths of the rods and equalizing the tension. These additional inclined braces support a considerable portion of the weight of the front end of the engine, and this weight is applied to the side frame members at a point very close to the front yoke 21 which yoke transmits the entire weight of the front end of the tractor to the front axle 11. The two V-shaped braces 26 and 52 not only constitute means for supporting the front end of the engine casing, but also prevent relative movement of the side frame members 50 i. e. twisting of the frame, when the tractor passes over rough ground.

As will be seen from Figures 7 and 8 the lower ends of rods 52 pass through apertures in the ends of a transverse member 54 mounted on bolt 24 intermediate the lugs 16ᵃ. There is no interference therefore between rods 52 and block 25. Member 54 also constitutes a spacing member transmitting the rearward thrust of the radius rod, or portion of this thrust, to the rear lug 16ᵃ. A spacer 23', comprising a short tubular member, is provided with the form of the invention shown in Figure 1, for a like purpose.

Having thus described the invention what is claimed as new and desired to be secured by Letters Patent is:

1. A tractor comprising in combination, an engine casing, a rear axle and rear traction wheels, the rear end of the casing being supported upon said axle and wheels, a front axle and wheels in advance of the engine casing, and a frame by means of which the forward end of the engine casing is supported upon the front axle, said frame including a side frame member on each side of the engine casing and extending in a generally horizontal direction from the rear axle forwardly over the front axle, a substantially vertical member secured to each of said side members and pivoted to the front axle, a horizontal brace connecting each side member to the top of the engine casing, a laterally inclined brace connecting each side member to the engine casing intermediate its top and bottom, and forwardly inclined brace means connecting the bottom of the casing to the side members in advance of the engine casing.

2. A tractor comprising in combination, an engine casing, a rear axle having traction wheels thereon, a front axle in advance of the engine casing, side frame members rigidly secured to the engine casing and projecting forwardly thereof above the front axle, a vertically disposed member rigidly secured to the side frame members and pivoted to the front axle centrally thereof, a horizontal brace connecting each side member to the top of the engine casing, a laterally inclined brace connecting each side member to the engine casing intermediate its top and bottom, and four brace rods, each rod being secured to the engine casing beneath the forward end thereof and connected to the side frame members, said rods being arranged in pairs transversely of the tractor.

3. A tractor comprising in combination, an engine casing, a rear axle and rear traction wheels, the rear end of the casing being supported upon said axle and wheels, a front axle and wheels in advance of the engine casing, and a frame by means of which the forward end of the engine casing is supported upon the front axle, said frame including a side frame member on each side of the engine casing and extending in a generally horizontal direction from the rear axle forwardly over the front axle, a substantially vertical member secured to each of said side members and pivoted to the front axle, a horizontal brace connecting each side member to the top of the engine casing, a laterally inclined brace connecting each side member to the engine casing intermediate its top and bottom, and forwardly inclined adjustable brace means connecting the bottom of the casing to the side members in advance of the engine casing.

4. A tractor comprising in combination, an engine casing, a rear axle and rear traction wheels, the rear end of the casing being supported upon said axle and wheels, a front axle and wheels in advance of the engine casing, and a frame by means of which the forward end of the engine casing is supported upon the front axle, said frame including a side frame member on each side of the engine casing and extending in a generally horizontal direction from the rear axle forwardly over the front axle, a transverse member forward of the front axle secured between side members, a substantially vertical member secured to each of said side members and pivoted to the front axle, a horizontal brace connecting each side member to the top of the engine casing, a laterally inclined brace connecting each side member to the engine casing intermediate its top and bottom, and forwardly inclined brace means connecting the bottom of the casing to the transverse member between the side members in advance of the engine casing.

5. A tractor comprising in combination, an engine casing, a rear axle and rear traction wheels, the rear end of the casing being supported upon said axle and wheels, a front axle and wheels in advance of the engine casing, and a frame by means of which the forward end of the engine casing is supported upon the front axle, said frame including a side frame member on each side of the engine casing and extending in a generally horizontal direction from the rear axle forwardly over the front axle, a substantially vertical member secured to each of said side members and pivoted to the front axle, horizontal braces securing the side members to the engine casing, lateral inclined braces securing the side members to the lower portion of the engine casing, and forwardly inclined braces connecting the bottom of the casing to the side members in advance of the engine casing.

In testimony whereof I hereunto affix my signature.

JOHN HART WILSON.